United States Patent [19]

Brummett et al.

[11] 3,928,670

[45] Dec. 23, 1975

[54] SELECTIVE PLATING ON NON-METALLIC SURFACES

[75] Inventors: Charles Roscoe Brummett, Harrisburg; Ray Ned Shaak, Lebanon, both of Pa.

[73] Assignee: AMP Incorporated, Harrisburg, Pa.

[22] Filed: Sept. 23, 1974

[21] Appl. No.: 508,601

[52] U.S. Cl. .................... 427/53; 96/48 PD; 106/1; 427/98; 427/256; 427/304; 427/305; 427/306

[51] Int. Cl.² ........................ C23C 3/02; H05K 3/10

[58] Field of Search .............. 117/47 A, 212; 106/1; 96/48 PD; 427/53, 98, 256, 304, 305, 306

[56] References Cited

UNITED STATES PATENTS

| | | | |
|---|---|---|---|
| 3,562,005 | 2/1971 | DeAngelo et al. | 117/212 |
| 3,779,758 | 12/1973 | Polichette | 117/212 X |

*Primary Examiner*—Ralph S. Kendall
*Assistant Examiner*—John D. Smith
*Attorney, Agent, or Firm*—Russell J. Egan, Esq.

[57] ABSTRACT

An aqueous method for the selective metallization of a non-conductive surface with nickel, copper, cobalt, or gold, a thin film of palladium dichloride is applied to a film after stannous chloride, a chelating agent and a dye operative as a catalyzing promoter active to a light between 4,500 A and 6,000 A or broadly 3,750 to 8,000 A are applied to the surface of a non-conductive material and that thin film is exposed in selected areas to light through a photographic negative to a light of a wave length determined by the dye. The thin film of the palladium salt, catalytic to the deposition of nickel, copper, cobalt, or gold from an electroless bath thereof causes selective deposition when the thus treated non-conductive material is then immersed in an electroless bath to metallize the areas which have been rendered catalytic by the action of dye and chelating agent in combination with the palladium salt. The preferred dye is Erythrosin dye and the chelating agent is orthopenanthroline.

7 Claims, 1 Drawing Figure

SELECTIVE PLATING ON NON-METALLIC SURFACES

Figure 1:
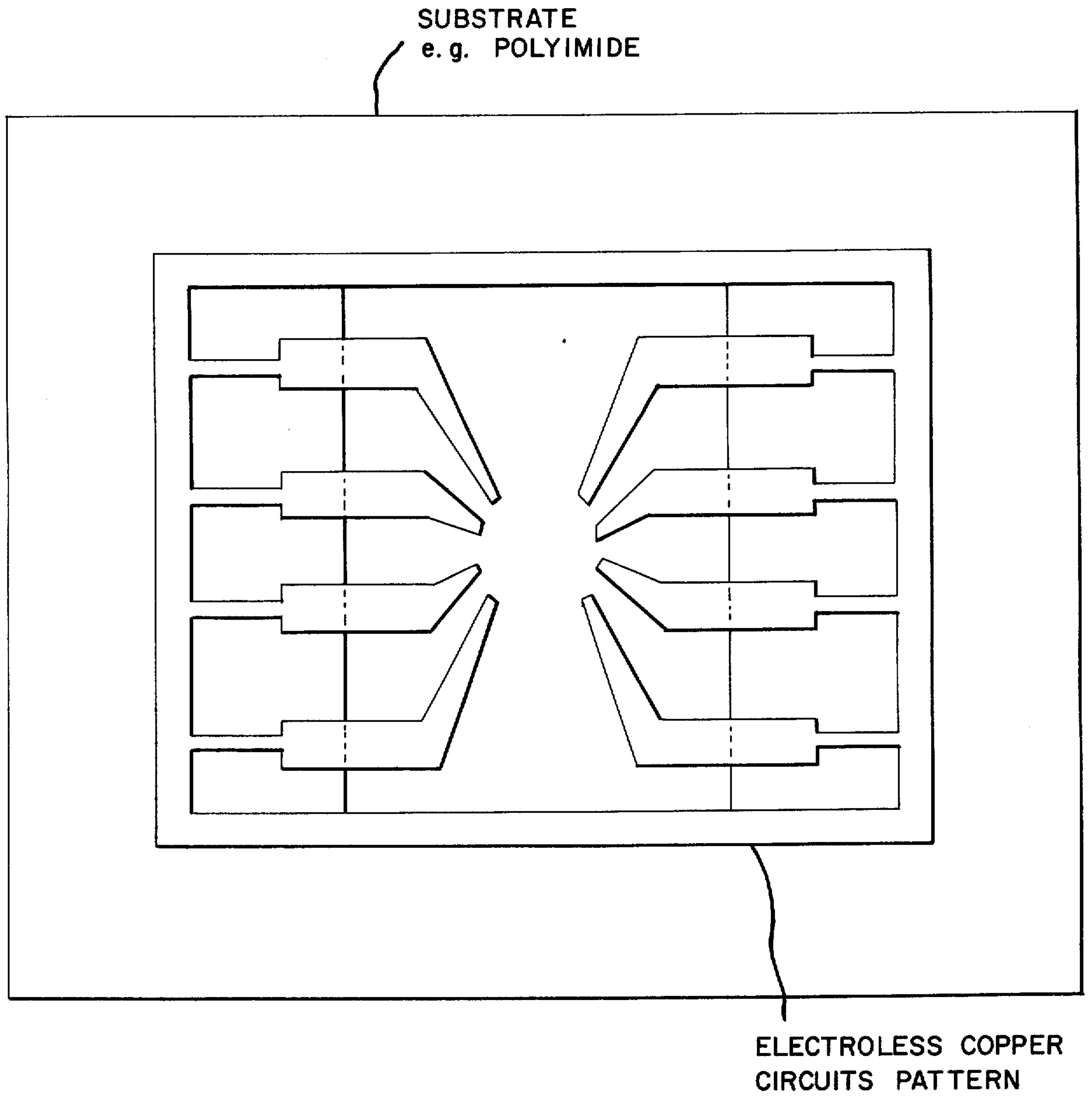

This invention relates broadly to processes for selectively metallizing of non-conductive surfaces by depositing metals from electroless metal plating baths; more specifically, this invention relates to a photographic-like method of forming, on a non-conductive substrate, a desired image or pattern which is catalytic to electroless nickel or copper deposition. Even more particularly, this invention relates to a process for manufacturing flat flexible, additive circuitry by photolytically deactivating within a certain wave length, stannous chloride which is on selected areas in a combination of elements comprising stannous chloride, a dye and a chelating agent. The precious metal is applied last and is inactive in areas in which the above combination is exposed to light. Thereafter the non-conductive substrate is exposed to a bath for depositing electroless metal from a bath on a residue pattern which has been rendered catalytic to the electroless metal.

Printed circuits and flat flexible circuitry have been used in numerous electrical and electronic application in many industries. A number of methods for producing selected metallic patterns on a variety of non-conductive surfaces are known and these processes include electroplating, electroless plating as well as various printing processes, and etching processes. Many of the processes and the advantages or disadvantages have been described in U.S. Pat. No. 3,562,005.

It has been recognized that satisfactory products and good economy are achieved when using electroless plating techniques to deposit the metal upon selected areas of the non-conductive surface. In general, electroless plating requires a sensitization of the substrate in the areas upon which metal is to be deposited from electroless solution. This sensitization is achieved by providing a pattern of a salt of precious metal on the substrate in the areas where it is desired to reduce the electroless metal from the solution thereof.

The emplacement of the salts which are catalytic to the reduction of electroless metal may be accomplished by the well-known techniques of masking the substrate or selectively applying the catalytic material as by silk screening or by the use of photographic techniques. These techniques and the techniques for depositing the thin film of metal from an electroless solution are disclosed in numerous patents, among them U.S. Pat. Nos. 3,259,559; 3,562,005; and 3,377,174; of these U.S. Pat. No. 3,562,005 is most closely related to the present invention.

Several problems have been associated with the prior art process disclosed in U.S. Pat. No. 3,562,005 and; namely, the described process requires the exposure of the substrate to an actinic light, i.e., a light of a wave length less than 3,000 A and generally between 1,800 A to 2,700 A.

It has now been discovered that if a proper combination of additives are incorporated with the deposited stannous chloride, the light absorportion may be in a visible light region, the light is more economically produced and better control with better safety is achieved. In effect, the novel combination of additives provides a more versatile process at improved process efficiencies.

It is therefore the primary object of this invention to provide an improved method for depositing electroless metal upon a non-conductive substrate.

It is a further and more specific object of the invention to provide a chemical process wherein a material catalytic to the reduction of electroless metal is deposited in a desired pattern upon a non-conductive surface with improved control and efficiency.

It is a further and related object of this invention to provide such a process which is efficient to use and which achieves the production of a strong and adherent conductor pattern on a variety of inexpensive, non-conductive polymeric materials.

It is a further related object of this invention to provide a process which provides printed circuits and flat flexible circuitry which is durable, heat resistant and inexpensive.

It is a further and more specific object of this invention to provide a technique for depositing upon a non-conductive substrate a pattern of a material which is catalytic to the subsequent reduction of electroless nickel, copper, cobalt, or gold from a bath thereof and to achieve this selective catalyzation of the non-conductive surface by a photolytic technique which is simple and efficient to use.

It is a further and related object of this invention to provide a photo-activated catalysis of a metallic salt which is catalytic to reduction of electroless metal from a suitable bath containing said metal.

These and other objects of this invention are achieved in a method for the selective electroless deposition of metals upon a non-conductive substrate wherein a thin film of a photo activated catalyst substance of palladium is provided on the substrate.

As an illustration of a suitable circuit, FIG. 1 shows, as an embodiment, a lead frame produced when practicing the present invention.

As the chelating agent, besides the orthopenanthroline compound, ethylenediaminetetracetic acid may be used.

The following dyes have been found suitable in the process of this invention.

Erythrosine (Color Index No. 45430); Methylrosaniline chloride; Azure A (Color Index No. 52010); Rose bengal (Color Index No. 45440); Malachite green (Color Index No. 42000); Eosin (Color Index No. 45380); Proflavin; Proflavin hydrogen chloride; Flouroscein (Color Index No. 45350); Flouroscein sodium (Color Index No. 45350).

In order to operate within the preferred absorbance peak of 4,800 A, Erythrosin dye (Color Index No. 45430) is used in combination with orthophenanthroline chelating agent as an embodiment of the invention. The other recited dyes, by the proper combination of dye and chelating agent, bring the absorbance within the visible light region, e.g., within the desired 4,500 A (blue light) and 6,000 A (orange light).

Commercial sources of 4,800 A light are readily available of the desired luminosity. Inasmuch as a laser light source is available such as argon ion laser, a modulated, scanning laser is now practical for the conversion of the active stannous (II) chloride to the inactive stannic (IV) chloride (which is no longer capable of reducing palladium dichloride to catalytically acting palladium).

In practicing the invention, a non-conductive polymer substrate is degreased and then etched. A polymer film such as Kapton (a polyimide) is worked up as follows:

The polyimide film is first degreased by a solvent dip. The most suitable degreasing agent is fluorinated hydrocarbons such as Freon. Other effective degreasing agents are chlorinated hydrocarbons such as 1,1,1-trichloroethane, trichloroethylene and carbon tetrachloride; and aromatic solvents such as xylene, toluene and chlorobenzene. After degreasing, the polyimide film is dipped in a 20% sodium hydroxide solution for one minute which attacks the imide linkage of the polymer, removes some low molecular weight fractions, and generates a thin gel-like coating on the surface. After a water rinse, the film is dipped in dilute hydrochloric acid to neutralize the caustic. The caustic surface conditionion improves adhesion of the metal to Kapton, reduces porosity in the electroless deposit and eliminates blistering when the pattern is plated in an electrolytic bath.

After the above treatment, the polymer substrate is then immersed in a solution of stannous chloride, a suitable dye and an appropriate chelating agent. After drying the surface is exposed through a photographic negative, or similar image mask, to light of a wavelength determined by the dye. The polymer is then immersed in a solution of palladium dichloride and given a fresh water rinse. When a polymer substrate, which has been treated in this manner, is immersed in an electroless copper, cobalt, gold, or nickel plating solution, only the previously unexposed areas will afford nucleation sites for the metal plating electrolessly.

This completely aqueous process is usefully employed to fabricate printed circuitry on flexible polymer tapes in a step-and-index or a continuous process. According to the present invention, circuitry may be manufactured additively without photoresist masking or chemical etching, but in a more facile manner. Finally, the substrate, having the catallytically active residue pattern, is immersed within an electroless bath and the electroless metal is deposited upon the residue pattern.

In the preferred embodiment, a non-conductive substrate is selectively metallized by applying to it a thin film of a combination of dye, stannous chloride and chelating agent.

The following tabulated concentrations have been used:

a. stannous chloride $10^{-2}$ moles;

b. dye $10^{-3}$ moles;

c. chelating agent $10^{-3}$ moles.

A suitable range for each is (a) $1 \times 10^{-2}$ to $2 \times 10^{-2}$; (b) $5 \times 10^{-4}$ to $3 \times 10^{-3}$; (c) $5 \times 10^{-4}$ to $3 \times 10^{-3}$.

Next, the polymer substrate as mentioned previously is immersed in a solution of palladium dichloride of a concentration $2 \times 10^{-2}$ moles and given a fresh water rinse; typically a range of concentration is $1 \times 10^{-2}$ moles to $5 \times 10^{-2}$ moles.

Thereafter an image corresponding to the non-light exposed areas is catalytic to electroless nickel, cobalt, gold, or copper which is formed on the substrate in the desired pattern. As a consequence, electroless copper, cobalt, gold, or nickel is deposited from a bath in which the thus treated surface is exposed but only on the catalytically active residue pattern.

It has been found that using the processes of this invention that printed circuitry can be efficiently manufactured in an electroless additive process without the requirements for photo-resist masking or back-etching of any metal. The printed circuitry manufactured has satisfactory mechanical and electrical characteristics.

The non-conductive substrates upon which the electroless images are applied may be selected from a braod grouping of substrate materials which have found use in electrical circuit applications. Among these are polyimide films such as "Kapton" manufactured by DuPont Company, and polyesters such as "Mylar," manufactured by DuPont.

For purposes of ready soldering the circuits, high temperature substrates are preferred.

Generally, a polymer substrate of one of the above polymers of a thickness from 0.0005 inch to 0.010 inch is used in flexible circuitry; however, the thickness of the substrate is a nonlimiting condition.

Teflon and other fluorocarbons may be metallized using the same procedure after the surface has been prepared by etching with a saturated solution of sodium in naptha (Tetroetch). Glass plate can also be metallized in this manner, however, the glass surface must be coated with a thin primer coating of epoxy which is first cured to achieve adequate bonding of the plated metal. Most any substrate which is inert to the solvent environment of the catalyst solution can be metallized by this technique; of the substrates those which will withstand a temperature of 210°C, i.e., a solder dip test temperature, are preferred.

Suitable inert, high temperature resistant substrates are described below.

For example, epoxy resins having a temperature capability of 550°F are suitable, tetrafluoro ethylene mentioned above and fluoroethylene polymers of a temperature resistance of at least 400°F are suitable. Other substrates and their useful upper temperature are polyarylsulfone (550°F) polyparabanic acid (550°F—disclosed in U.S. Pat. Nos. 3,347,897; 3,591,562; and 3,661,859); the previously mentioned polyimides and polyimides-amines (480°F); polyphenylene sulfide (550°F); polysulfones (345°F); silicon polymers, e.g., dimethyl or diphenyl siloxanes (room temperature vulcanizates—500°F) and poly-2,4-imidazolidinediones (polyhydantions) (manufactured by Bayer A.G. Germany and available from Mobay Chemical, Pittsburg, Pa.). A number of the above polymers are described in Lee et al. *New Linear Polymers*, McGraw-Hill, N.Y., N.Y. (1967).

In general, all high temperature polymers, i.e., having a temperature capable of resisting solder dip temperatures of 210° to 220°C are useful. In accordance with this invention, the preferred polymer substrates are capable of withstanding the above temperatures for a time sufficient in a solder dip (about a 5 to 10 sec. dip). Of the above substrates, the polyimides are the first choice.

Next, the polyester type substrates, such as Mylar film, are also highly desirable. These will withstand temperatures such as about 145°C for considerable periods. Polyesters having a capability of withstanding temperatures up to 200°C for brief periods are also known.

Suitable polyesters are described by Bjorksten et al., "Polyesters and Their Application", Reinhold Publishing Corporation (1956) such as in the chapters pertaining to unsaturated and saturated polyesters, the disclosure of which is incorporated by reference.

Other suitable substrates are readily available in the art and their properties dictate the choice of these substrates. Among these are the polycarbonates, polyacetals, polyamides, polyphenylene oxides, polypropylenes, etc. These substrates are adequately described in a number of literature sources.

A palladium metal concentration of 2.1 gm/l Pd catalyst solution produces a catalyzed polyimide surface on which 9–10 microinches of high integrity nickel deposits after a three minute immersion at 76°C in an agitated electroless nickel bath of the composition identified below as "Electroless Nickel I."

Suitable electroless baths are identified herein below.

| | | |
|---|---|---|
| **Electroless Coppers:** | | |
| I. | Copper Sulphate | 10 gm/l |
| | Sodium Hydroxide | 10 gm/l |
| | Formaldehyde (37–71% W/V) | 10 ml/l |
| | Sodium Potassium Tartrate | 50 gm/l |
| II. | Cupric Oxide | 3.0 gm/l |
| | Sodium Hypophosphite | 10 gm/l |
| | Ammonium Chloride | 0.1 gm/l |
| III. | Copper Sulphate | 13.8 gm/l |
| | Sodium Potassium Tartrate | 69.2 gm/l |
| | Sodium Hydroxide | 20 gm/l |
| | Formaldehyde (36% W/V,* 12.5% $CH_3OH$) | 40 ml/l |
| | 2-Mercaptobenzothiazole | 0.003% |
| *weight by volume | | |
| Bath Temp: Ambient | | |
| **Electroless Nickel:** | | |
| I. | Nickel Chloride | 80 gm/l |
| | Sodium Citrate | 100 gm/l |
| | Ammonium Chloride | 50 gm/l |
| | Sodium Hypophosphite | 10 gm/l |
| Bath Temp.: 180°F ± 20 | | |
| II. | Nickel Chloride Hexahydrate | 20 gm/l |
| | Ethylene Diamine (98%) | 45 gm/l |
| | Sodium Hydroxide | 40 gm/l |
| | Sodium Borohydride | 0.67 gm/l |
| Bath Temp.: 180°F | | |
| **Electroless Cobalt:** | | |
| I. | Chloride Hexahydrate | 30 gm/l |
| | Sodium Citrate Pentahydrate | 35 gm/l |
| | Ammonium Chloride | 50 gm/l |
| | Sodium Hopophosphite, Monohydrate | 20 gm/l |
| Bath Temp.: 180°F | | |
| II. | Cobalt Sulphate, Heptahydrate | 24 gm/l |
| | Ammonium Sulphate | 40 gm/l |
| | Sodium Hypophosphite | 20 gm/l |
| | Sodium Citrate | 80 gm/l |
| | Sodium Lauryl Sulphate | 0.1 gm/l |
| Bath Temp.: 180°F | | |

Some of the illustrated baths are well known in the art and reference may be had to U.S. Pat. Nos. 3,095,309 and 3,546,009 which disclose electroless copper deposition baths and to Brenner, "Metal Finishing" November, 1954, pages 68 to 76, which disclose electroless nickel baths. Electroless gold baths are disclosed in U.S. Pat. Nos. 3,123,484; 3,214,292; and 3,300,328 the disclosure of which is incorporated by reference. Typically, the electroless metal baths comprise a source of the metal ions, a reducing agent for those ions, a complexing agent and a compound for pH adjustment.

With respect to the above baths; the alkali baths are a second choice when using the polyimides, polyimidesamides, polyparabanic acid, or polyhydantions; an acid or neutral electroless bath is preferred.

For electroless copper deposition, the following other baths were also tested and the deposits found to be acceptable: Dynachem-240; Shipley-328Q; MacDermid-9055.

For electroless nickel deposition, the following baths were also tested and the deposits found to be acceptable; Shipley XP-7006 and Richardson-Niklad-759A.

The adherence of the electroless metal coating was tested by the scotch tape test and was found to be acceptable.

What is claimed is:

1. A method for the selective electroless deposition of metals upon a substrate comprising the steps of:

a. applying to the said substrate a thin film of a combination of (1) a dye, (2) stannous dichloride and (3) a chelating agent, said combination having a light absorbance with 3,750 A to 8,000 A wavelength, said dye being selected from the group consisting of methylrosaniline chloride, azure - A, rose bengal, malachite green, eosin, proflavin, proflavin hydrogen chloride, fluoroscein, fluoroscein sodium; erythrosin and mixtures thereof, said chelating agent being selected from the group consisting of ortho-phenanthroline and ethylenediamine tetraacetic acid;

b. exposing a selected area of the said substrate to which said combination of (1), (2) and (3) has been applied, to light in said wavelength to effect deactivation of said stannous chloride and create an image catalytic to electroless metal in non-exposed areas;

c. depositing palladium chloride on said substrate treated according to (a) and (b) steps; and d. immersing in an electroless metal bath said substrate with said salt in the areas rendered catalytically active by the active residue of stannous chloride, said bath providing electrolessly a deposit of said metal on said catalytically active sites.

2. The process as defined in claim 1 wherein said dye is erythrosin dye.

3. The process as defined in claim 1 wherein said chelating agent is ortho-phenanthroline.

4. The process as defined in claim 1 wherein said electrolessly deposited metal is copper.

5. The process as defined in claim 1 and wherein said electrolessly deposited metal is nickel.

6. The process as defined in claim 1 and wherein said substrate is a polyimide.

7. The process as defined in claim 1 and wherein the light absorbance of said combination is within 4,500 A to 6,000 A.

* * * * *